(12) United States Patent
Wang

(10) Patent No.: US 11,667,759 B2
(45) Date of Patent: Jun. 6, 2023

(54) POLYIMIDE COMPOSITE, A METHOD OF PREPARING THEREOF, AND APPLICATION THEREOF

(71) Applicant: WUHAN CHINA STAR OPTOELECTRONICS SEMICONDUCTOR DISPLAY TECHNOLOGY CO., LTD., Wuhan (CN)

(72) Inventor: Yamin Wang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 400 days.

(21) Appl. No.: 16/772,597

(22) PCT Filed: Mar. 31, 2020

(86) PCT No.: PCT/CN2020/082340
§ 371 (c)(1),
(2) Date: Jun. 12, 2020

(87) PCT Pub. No.: WO2021/134946
PCT Pub. Date: Jul. 8, 2021

(65) Prior Publication Data
US 2022/0112337 A1    Apr. 14, 2022

(30) Foreign Application Priority Data
Dec. 30, 2019  (CN) .......................... 201911397941.2

(51) Int. Cl.
| | |
|---|---|
| *C08G 83/00* | (2006.01) |
| *C08G 73/10* | (2006.01) |
| *C08K 5/01* | (2006.01) |
| *C08B 37/16* | (2006.01) |
| *C09C 3/08* | (2006.01) |
| *C09D 5/08* | (2006.01) |

(52) U.S. Cl.
CPC ........ *C08G 83/001* (2013.01); *C08B 37/0015* (2013.01); *C08G 73/1067* (2013.01); *C08G 83/008* (2013.01); *C08K 5/01* (2013.01); *C09C 3/08* (2013.01); *C08G 2150/90* (2013.01); *C09D 5/08* (2013.01)

(58) Field of Classification Search
CPC .... C09C 3/08; C09C 3/10; C08K 9/04; C08L 79/08; C09D 179/08
See application file for complete search history.

(56) References Cited

U.S. PATENT DOCUMENTS

| | | |
|---|---|---|
| 8,987,352 B1 | 3/2015 | Ou et al. |
| 2020/0332134 A1 | 10/2020 | Wang |

FOREIGN PATENT DOCUMENTS

| | | | |
|---|---|---|---|
| CN | 104592702 | A | 5/2015 |
| CN | 106590310 | A | 4/2017 |
| CN | 107304240 | A | 10/2017 |
| CN | 108102449 | A | 6/2018 |
| CN | 108318943 | A | 7/2018 |
| CN | 109575536 | A | 4/2019 |
| CN | 110105868 | A | 8/2019 |
| CN | 113388274 | A * | 9/2021 |
| GB | 2421952 | B | 4/2010 |
| JP | 2018204004 | A | 12/2018 |
| KR | 20090043726 | A | 5/2009 |
| WO | 2013164843 | A1 | 11/2013 |

OTHER PUBLICATIONS

Machine translation of CN 113388274 (no date).*

* cited by examiner

*Primary Examiner* — Marc S Zimmer
(74) *Attorney, Agent, or Firm* — PV IP PC; Wei Te Chung; Zhigang Ma

(57) ABSTRACT

A polyimide composite, a method of preparing thereof, and an application thereof are provided. A general structure of the polyimide composite is: $SiO_2\text{-}(\beta\text{-CD-Ada})_x/PI$, and x is 3 to 5. The polyimide composite has the functions of self-repairing and anti-aging.

10 Claims, 2 Drawing Sheets

POLYIMIDE COMPOSITE, A METHOD OF PREPARING THEREOF, AND APPLICATION THEREOF

BACKGROUND OF INVENTION

Field of Invention

The present invention relates to the field of materials science and technology, and more particularly, to a polyimide composite, a method of preparing thereof, and application thereof.

Description of Prior Art

Corrosion protection of metals has always been a topic of great concern in the scientific research field. In industrial production, coatings on equipment surface may slow down or prevent metal corrosion reactions and prolong equipment lifecycle. However, the self-repairing performance of conventional coatings is not enough, where the coatings are easily damaged under external forces and lose their barrier protection, and the protection stability and sustainability are weak. Specifically, during operation of the equipment, the coating on the equipment surface is vulnerable to mechanical damage and microcracks. Destructive factors may penetrate the cracks and cause macro-cracks. As a result, some of the metal inside the equipment is exposed to the air and easily eroded by wind and rain, affecting performance and lifetime of the equipment.

Self-repairing material, also known as smart material, is a new type of material that may self-repair when an object suffers external damage. As intelligence becomes a new material development trend, new metal protective materials capable of overcoming traditional coatings that are easily damaged have attracted widespread attention. In the prior art, there are no reports of polyimide-based self-repairing materials.

SUMMARY OF INVENTION

A main object of the present invention is to provide a polyimide composite with functions of self-repairing and anti-aging.

To achieve the main object of the present invention, the technical solution adopted by the present invention is described as follows.

A polyimide composite comprises: a polyimide resin and an assembly body distributed in the polyimide resin, wherein the polyimide resin is a polycondensate of an aromatic diamine and an aromatic dianhydride; the assembly body is made of $SiO_2$ grafted β-cyclodextrin and reacted with adamantane by an inclusion reaction; and the polyimide composite has a structural formula as follows: $SiO_2$-(β-CD-Ada)$_x$/PI, and x is 3 to 5.

Another object of the present invention is to provide a method of preparing a polyimide composite as described above, which has the characteristics of simple method, environmental protection, high synthesis efficiency, and high product yield.

A method of preparing the polyimide composite comprises following steps:
 (1) performing a graft reaction between $SiO_2$ and β-cyclodextrin, wherein a product is $SiO_2$-(β-CD)$_x$, and x is 3 to 5;
 (2) performing an inclusion reaction between the $SiO_2$-(β-CD)$_x$ and adamantane, wherein a product is $SiO_2$-(β-CD-Ada)$_x$, and x is 3 to 5;
 (3) performing a polycondensation reaction, and diamine compound, dianhydride compound, and sodium amantadine are reacted through the polycondensation reaction, and a product is PAA; and
 (4) performing a grafting reaction and a cyclization reaction, and the PAA and the $SiO_2$-(β-CD-Ada)$_x$ are reacted through the grafting reaction and the cyclization reaction in order to form the polyimide composite, and the polyimide composite is $SiO_2$-(β-CD-Ada)$_x$/PI, and x is 3 to 5.

In one embodiment, the β-cyclodextrin is fully dissolved in a NaOH solution in the step (1), then epichlorohydrin is added, and nano-sized $SiO_2$ is slowly added at a stirring speed of 500 to 800 rpm, a grafting reaction is performed at 60° C., the grafting reaction is finished when viscosity occurs, then the solvent is removed by suspension distillation, a obtained dry solid is $SiO_2$-(β-CD)$_x$, and a molar ratio of $SiO_2$ to β-cyclodextrin is (0.25-5.0):1.

In one embodiment, the $SiO_2$-(β-CD)$_x$ and the adamantane are mixed in a molar ratio of (2-5):(1-3) in the step (2), and stirred for 24 to 96 hours under normal temperature conditions.

In one embodiment, a structural formula of the diamine compound in the step (3) is $NH_2$-Ar-$NH_2$, and the Ar is selected from one of

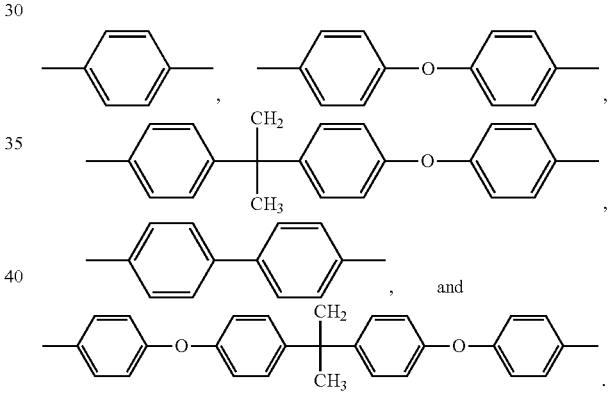

In one embodiment, a structural formula of the dianhydride compound in the step (3) is

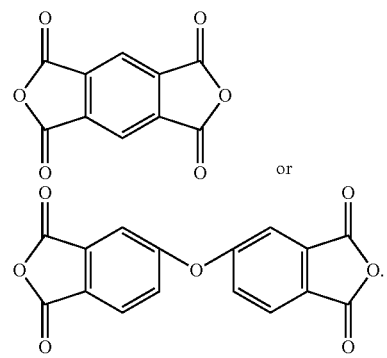

In one embodiment, the diamine compound, the dianhydride compound and the sodium adamantane are mixed in a molar ratio of (1.05-2): 1: (1.1-9.9) and dissolved in a solvent at 80° C. for 6 to 10 hours in the step (3), and the solvent is one of N-methylpyrrolidone, N, N-dimethylformamide, and toluene.

In one embodiment, the PAA and the $SiO_2$-($\beta$-CD-Ada)$_x$ are mixed in a mass ratio of (5-15):(85-95) in the step (4) and stirred at 0° C. for 24 to 96 hours, and then temperature is raised to 80° C. and a reaction is performed for 5 to 18 hours; and the cyclization reaction in the step (4) comprises coating a graft reaction product on a glass substrate, baking and removing a solvent at 120° C., and then stepwise heating to 450° C., and then baking at a constant temperature for 0.8 to 1.2 hours to obtain the polyimide composite.

In one embodiment, a rate of stepwise heating is 4-8° C./min.

Another object of the present invention is to provide a use of the polyimide composite for coating.

The beneficial effect of the present invention is that $SiO_2$, which is an inorganic reinforcing particle, may not only make material have an ability to resist ultraviolet radiation, but also may improve mechanical properties of the material. By introducing $SiO_2$ as anti-aging nano-filled particles, it may impart reversible repair performance to weak bonds of materials. The re-formation of the bond is based on the good inclusion capacity of cyclodextrin and adamantane. When it is damaged, it makes the inclusion of cyclodextrin and adamantane again under a normal condition, so the material has an intelligent property such as self-repairing.

DETAILED DESCRIPTION OF PREFERRED EMBODIMENTS

Figure 1:
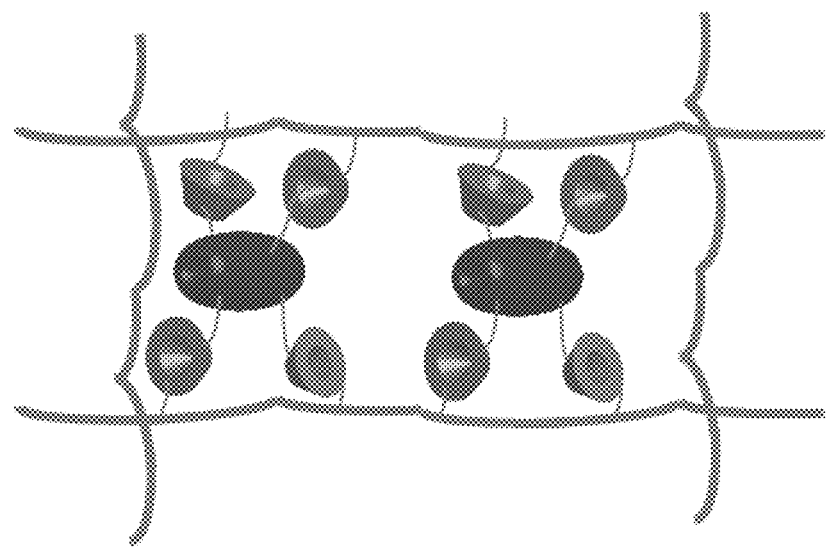
FIG. 1 is a schematic view of a polyimide composite.

A polyimide composite includes a polyimide resin and an assembly body distributed in the polyimide resin, and the polyimide resin is a polycondensate of an aromatic diamine and an aromatic dianhydride; the assembly body is made of $SiO_2$ grafted $\beta$-cyclodextrin and reacted with adamantane by an inclusion reaction; and the polyimide composite has a structural formula as follows: $SiO_2$-($\beta$-CD-Ada)$_x$/PI, and x is 3 to 5. The polyimide resin and the assembly body are connected by chemical bonds to form a stable compound. By introducing $SiO_2$ as anti-aging nano-filled particles, it may impart reversible repair performance to weak bonds of materials. The re-formation of the bond is based on the good inclusion capacity of cyclodextrin and adamantane. When it is damaged, it makes the inclusion of cyclodextrin and adamantane again under a normal condition, so the material has an intelligent property such as self-repairing.

A method of preparing the polyimide composite includes following steps:
(1) performing a graft reaction between $SiO_2$ and $\beta$-cyclodextrin, wherein a product is $SiO_2$-($\beta$-CD)$_x$, and x is 3 to 5;
(2) performing an inclusion reaction between the $SiO_2$-($\beta$-CD)$_x$ and adamantane, wherein a product is $SiO_2$-($\beta$-CD-Ada)$_x$, and x is 3 to 5;
(3) performing a polycondensation reaction, wherein diamine compound, dianhydride compound, and sodium amantadine are reacted through the polycondensation reaction, and a product is PAA; and
(4) performing a grafting reaction and a cyclization reaction, wherein the PAA and the $SiO_2$-($\beta$-CD-Ada)$_x$ are reacted through the grafting reaction and the cyclization reaction in order to form the polyimide composite, and the polyimide composite is $SiO_2$-($\beta$-CD-Ada)$_x$/PI, and x is 3 to 5.

Cyclodextrin is a cyclic oligosaccharide, and $\beta$-cyclodextrin is abbreviated as $\beta$-CD. In the step (1), based on the characteristics of insufficient surface atom coordination number, high surface energy, and easy agglomeration of $SiO_2$, chemical reaction between the reaction groups on the surface of $SiO_2$ and $\beta$-cyclodextrin is occurred to achieve surface grafting.

$\beta$-cyclodextrin has a cavity structure and is driven by driving forces such as van der Waals force, hydrophobic force, and hydrogen bonding, and thus the $\beta$-cyclodextrin grafted with $SiO_2$ may undergo an inclusion reaction with adamantane to form a stable inclusion compound $SiO_2$-($\beta$-CD-Ada)$_x$.

The $SiO_2$-($\beta$-CD-Ada)$_x$ and the PAA are reacted through a grafting reaction and a cyclization reaction in order to form a polyimide composite.

Preferably, the $\beta$-cyclodextrin is fully dissolved in a NaOH solution in the step (1), then epichlorohydrin is added, and nano-sized $SiO_2$ is slowly added at a stirring speed of 500 to 800 rpm, a grafting reaction is performed at 60° C., the grafting reaction is finished when viscosity occurs, then the solvent is removed by suspension distillation, a obtained dry solid is $SiO_2$-($\beta$-CD)$_x$, and a molar ratio of $SiO_2$ to $\beta$-cyclodextrin is (0.25-5.0):1.

Preferably, the $SiO_2$-($\beta$-CD)$_x$ and the adamantane are mixed in a molar ratio of (2-5):(1-3) in the step (2), and stirred for 24 to 96 hours under normal temperature conditions.

Preferably, a structural formula of the diamine compound in the step (3) is $NH_2$-Ar-$NH_2$, and the Ar is selected from one of

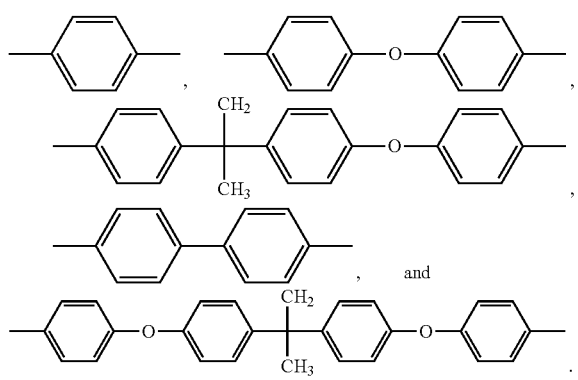

Preferably, a structural formula of the dianhydride compound in the step (3) is

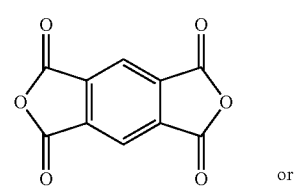

or

-continued

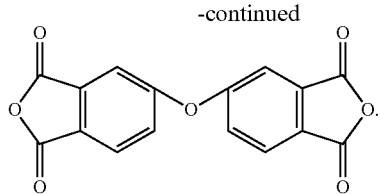

Specifically, the diamine compound, the dianhydride compound and the sodium adamantane are mixed in a molar ratio of (1.05-2): 1: (1.1-9.9) and dissolved in a solvent at 80° C. for 6 to 10 hours in the step (3), and the solvent is one of N-methylpyrrolidone, N, N-dimethylformamide, and toluene.

Specifically, the PAA and the $SiO_2$-($\beta$-CD-Ada)$_x$ are mixed in a mass ratio of (5-15):(85-95) in the step (4) and stirred at 0° C. for 24 to 96 hours, and then temperature is raised to 80° C. and a reaction is performed for 5 to 18 hours.

The cyclization reaction in the step (4) comprises coating a graft reaction product on a glass substrate, baking and removing a solvent at 120° C., and then stepwise heating to 450° C., and then baking at a constant temperature for 0.8 to 1.2 hours to obtain the polyimide composite.

Preferably, a rate of stepwise heating is 4-8° C./min.

Because the above polyimide composite or the polyimide composite prepared by the method described above has a self-repairing function and may have an ability to resist a certain external damage, it has excellent application properties for coatings or protective materials. The polyimide composite may be used alone or mixed with other ingredients so as to decorate and protect buildings.

In the following, the present invention is further explained by way of Examples 1 to 3.

Example 1: Preparation of a Polyimide Composite (1) first, dissolving 10.0 g β-CD (0.88 mmol) in 16 mL NaOH (33 wt %) solution and sonicate for 30 min until the dissolution is completed. After cooling the solution to 30° C., add 6.89 mL epichlorohydrin is added quickly. In rapid stirring (600 rpm), slowly adding 0.89 g of nano-sized $SiO_2$. After adding nano-sized $SiO_2$ is completed, slowly raising the temperature to 60° C. and continue stirring for 25 hours to make the mixed solution appear relatively viscous. Then, the reaction is finished. Next, the solvent is removed by suspension distillation to obtain a dry solid, which is $SiO_2$-(β-CD)$_x$;

(2) mixing the $SiO_2$ grafted β-cyclodextrin obtained in step (1) with 0.72 g adamantane, and stirring for 60 hours under normal temperature conditions to obtain an assembly body;

(3) dissolving 1.4 g diamine compound, 2.3 g dianhydride compound and 0.70 g sodium adamantane in 30 mL N-methylpyrrolidone, and then reacting at 80° C. for 8 hours to obtain a polyamic acid solution named as PAA;

(4) mixing 11 g PAA and 17 g assembly body, and the reaction is stirred at 0° C. for 60 hours, and then the temperature is raised to 80° C. Then, the obtained reaction product is spin-coated on a glass substrate, and 70% the solvent is baked at 120° C. The temperature is raised to 450° C. in steps at a rate of 6° C./min, and then is baked for 1 hour at a constant temperature to obtain a polyimide composite. The schematic view of polyimide composite structure is shown in FIG. 1.

The structural formula of the diamine compound is

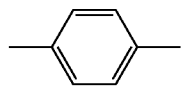

The structural formula of the dianhydride compound is

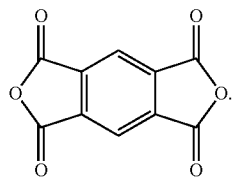 [SMILES: O=c1oc(=O)c2cc3c(=O)oc(=O)c3cc12]

Example 2: Preparation of a Polyimide Composite

The preparation method of Example 1 is adopted, except that the structural formula of the diamine compound is

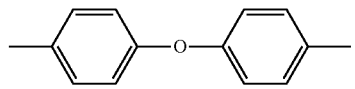

The amount of diamine compound is 1.5 g.

Example 3: Preparation of a Polyimide Composite

The preparation method of Example 1 is adopted, except that the structural formula of the diamine compound is

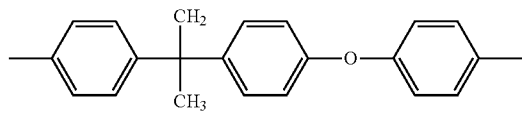

The amount of diamine compound is 1.05 g.

Example 4: Preparation of a Polyimide Composite

The preparation method of Example 1 is adopted, except that the structural formula of the diamine compound is

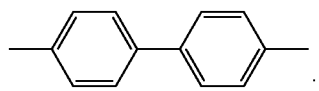

The amount of diamine compound is 1.6 g.

Example 5: Preparation of a Polyimide Composite

The preparation method of Example 1 is adopted, except that the structural formula of the diamine compound is

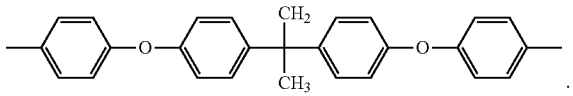

The amount of diamine compound is 0.95 g.

Example 6: Preparation of a Polyimide Composite

The preparation method of Example 2 is adopted, except that the structural formula of the dianhydride compound is

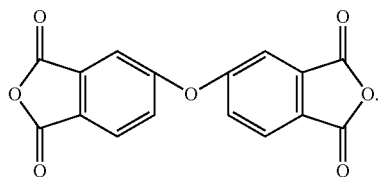 [SMILES: O=C1OC(=O)c2cc(Oc3ccc4c(c3)C(=O)OC4=O)ccc21]

The amount of dianhydride compound is 2.8 g.

Figure 2:
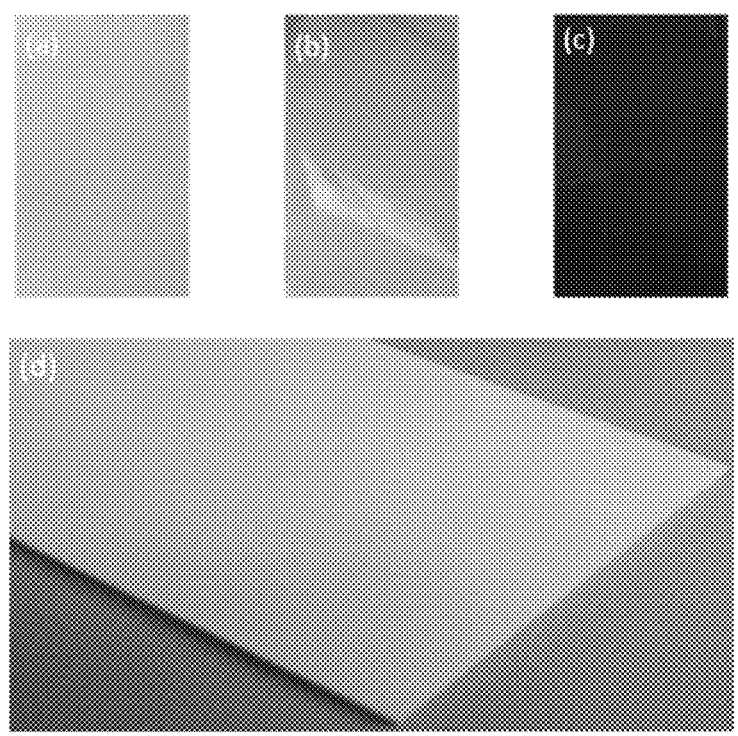
FIG. 2 is a schematic view of anti-aging performance test for the polyimide composite.

Performance Test:

1. Anti-Aging Performance Test:

Taking two metal plates with polytetrafluoroethylene (PTFE) as base material. The thickness, size, and material of the plates are exactly the same. A surface of one of the metal plates is coated with the polyimide composite prepared in Example 1. The thickness of the coating is 0.1 mm. After coating, the color of the metal plate is light green as shown in FIG. 2 (a). A surface of another metal plate is painted with 0.1 mm Teflon. After coating, the color of the plate is white as shown in FIG. 2(d).

Two metal plates are subjected to a strong ultraviolet accelerated aging test. After the metal plates coated with the polyimide composite are subjected to a strong ultraviolet accelerated aging test, the color of the plate is shown in FIG. 2 (b). It almost no change as light green color of FIG. 2 (a). However, after the metal plate coated with polytetrafluoroethylene is subjected to the accelerated ultraviolet aging test, the color of the plate body is shown in FIG. 2 (c), which shows a tan that is greatly different from the color shown in FIG. 2 (d). Therefore, it can be seen that the material prepared by the present invention has obvious anti-aging properties.

2. Self-Repairing Performance Test

Figure 3:
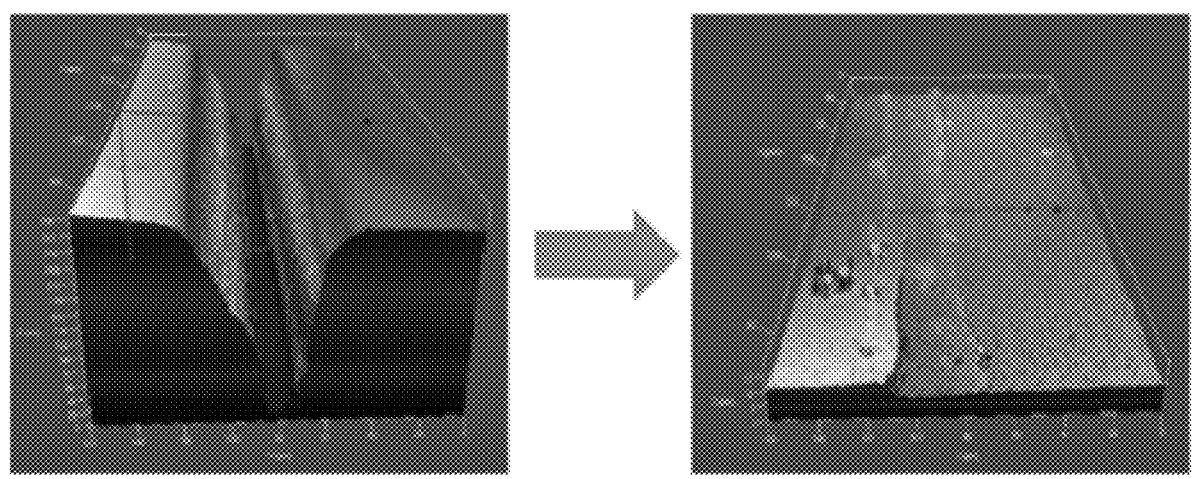
FIG. 3 is a schematic view of comparison of materials before and after undergoing micro-repair.

Experimental process: use a scalpel to draw a scratch of the obtained SiO$_2$-(β-CD-Ada)$_x$/PI composite film about 10 mm, and observe the cross-section and contour of the scratch with a laser confocal. Set 12 h to 24 h, observe the microscopic view of the cracks again and compare them. As a result, a laser confocal scanning microscope is used to study the micro-repair performance of the material, and the results are shown in FIG. 3. It can be seen from FIG. 3 that the scratches are basically disappear after repairing, that is, the material prepared by the present invention may achieve the self-repairing function.

INDUSTRIAL APPLICABILITY

The subject matter of this application can be manufactured and used in industry with industrial applicability.

What is claimed is:

1. A polyimide composite, comprising: a polyimide resin and an assembly body distributed in the polyimide resin, wherein the polyimide resin is a polycondensate of an aromatic diamine and an aromatic dianhydride; the assembly body is made of β-cyclodextrin grafted SiO$_2$ and reacted with adamantane by an inclusion reaction; and the polyimide composite has a structural formula as follows:

SiO$_2$-(β-CD-Ada)$_x$/PI, wherein x is 3 to 5.

2. A method of preparing the polyimide composite according to claim 1, comprising the following steps:
   (1) performing a graft reaction between SiO$_2$ and β-cyclodextrin, wherein a product is SiO$_2$-(β-CD)$_x$, and x is 3 to 5;
   (2) performing an inclusion reaction between the SiO$_2$-(β-CD)$_x$ and adamantane, wherein a product is SiO$_2$-(β-CD-Ada)$_x$, and x is 3 to 5;
   (3) performing a polycondensation reaction, wherein diamine compound, dianhydride compound, and sodium amantadine are reacted through the polycondensation reaction, and a product is PAA; and
   (4) performing a grafting reaction and a cyclization reaction, wherein the PAA and the SiO$_2$-(β-CD-Ada)$_x$ are reacted through the grafting reaction and the cyclization reaction in order to form the polyimide composite, and the polyimide composite is SiO$_2$-(β-CD-Ada)$_x$/PI, and x is 3 to 5.

3. The method of preparing the polyimide composite according to claim 2, wherein the β-cyclodextrin is fully dissolved in a NaOH solution in the step (1), then epichlorohydrin is added, and nano-sized SiO$_2$ is slowly added at a stirring speed of 500 to 800 rpm, a grafting reaction is performed at 60° C., the grafting reaction is finished when viscosity occurs, then the solvent is removed by suspension distillation, a obtained dry solid is SiO$_2$-(β-CD)$_x$, and a molar ratio of SiO$_2$ to β-cyclodextrin is (0.25-5.0):1.

4. The method of preparing the polyimide composite according to claim 2, wherein the SiO$_2$-(β-CD)$_x$ and the adamantane are mixed in a molar ratio of (2-5):(1-3) in the step (2), and stirred for 24 to 96 hours under normal temperature conditions.

5. The method of preparing the polyimide composite according to claim 2, wherein a structural formula of the diamine compound in the step (3) is NH$_2$—Ar—NH$_2$, and the Ar is selected from one of

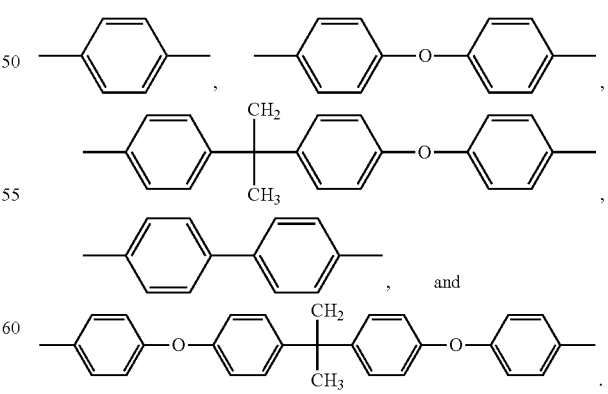

6. The method of preparing the polyimide composite according to claim 2, wherein a structural formula of the dianhydride compound in the step (3) is

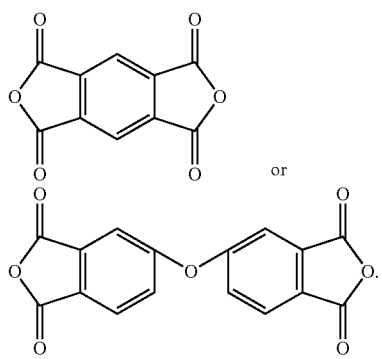 or

7. The method of preparing the polyimide composite according to claim 2, wherein the diamine compound, the dianhydride compound and the sodium adamantane are mixed in a molar ratio of (1.05-2): 1: (1.1-9.9) and dissolved in a solvent at 80° C. for 6 to 10 hours in the step (3), and the solvent is one of N-methylpyrrolidone, N, N-dimethylformamide, and toluene.

8. The method of preparing the polyimide composite according to claim 2, wherein the PAA and the $SiO_2$-(β-CD-Ada)$_x$ are mixed in a mass ratio of (5-15):(85-95) in the step (4) and stirred at 0° C. for 24 to 96 hours, and then temperature is raised to 80° C. and a reaction is performed for 5 to 18 hours; and wherein the cyclization reaction in the step (4) comprises coating a graft reaction product on a glass substrate, baking and removing a solvent at 120° C., and then stepwise heating to 450° C., and then baking at a constant temperature for 0.8 to 1.2 hours to obtain the polyimide composite.

9. The method of preparing the polyimide composite according to claim 8, wherein a rate of stepwise heating is 4-8° C./min.

10. A method of forming a self-preparing coating, comprising coating the polyimide composite according to claim 1 on a surface of base material for coating.

\* \* \* \* \*